United States Patent Office 2,939,890
Patented June 7, 1960

2,939,890

ALKYLATION OF AROMATIC HYDROCARBONS

George L. Hervert, Downers Grove, and Carl B. Linn, Riverside, Ill., assignors, by mesne assignments, to Universal Oil Products Company, Des Plaines, Ill., a corporation of Delaware No Drawing. Filed Mar. 18, 1958, Ser. No. 722,121

19 Claims. (Cl. 260—671)

This invention relates to a process for the alkylation of aromatic hydrocarbons, and more particularly relates to a process for the alkylation of aromatic hydrocarbons with olefin-acting compounds in the presence of a catalyst comprising a boron trifluoride modified substantially anhydrous inorganic oxide. Still more particularly this invention relates to a process for the alkylation of aromatic hydrocarbons with olefin-acting compounds in the presence of a catalyst comprising boron trifluoride and boron trifluoride modified substantially anhydrous gamma- or theta-alumina.

An object of this invention is to produce alkylated aromatic hydrocarbons, and more particularly to produce benzene hydrocarbons. A specific object of this invention is to produce ethylbenzene, a desired chemical intermediate, which is utilized in large quantities in dehydrogenation process for the manufacture of styrene, one starting material in the production of some synthetic rubbers. Another specific object of this invention is a process for the production of cumene by the reaction of benzene with propylene, which cumene product may be oxidized to form cumene hydroperoxide, which latter compound is readily decomposed into phenol and acetone. Another object of this invention is the production of para-diisopropylbenzene, which diisopropylbenzene product is oxidized to terephthalic acid, one starting material for the production of some synthetic fibers. A further specific object of this invention is to produce alkylated aromatic hydrocarbons boiling within the gasoline boiling range having high antiknock value and which may be used as such or as components of gasoline suitable for use in automobile engines. Still another object of this invention is the alkylation of aromatic hydrocarbons with so-called refinery off-gases or dilute olefin streams, said olefin-containing streams having olefin concentrations in quantities so low that such streams have not been utilized satisfactorily as alkylating agents in existing processes without prior intermediate olefin concentration steps. This and other objects of the invention will be set forth hereinafter in detail as part of the accompanying specification.

Previously, it has been suggested that boron trifluoride can be utilized as a catalyst for the alkylation of aromatic hydrocarbons with unsaturated hydrocarbons. For example, Hofmann and Wulff succeeded in replacing aluminum chloride by boron trifluoride for catalysis of condensation reactions of the Friedel-Crafts type; (German Patent 513,414, British Patent 307,802, and French Patent 665,812). Aromatic hydrocarbons such as benzene, toluene, tetralin, and naphthalene have been condensed with ethylene, propylene, isononylene, and cyclohexene in the presence of boron trifluoride with the production of the corresponding mono- and polyalkylated aromatic hydrocarbon derivatives. In these processes rather massive amounts of boron trifluoride have been utilized as the catalyst. Similarly, the olefin utilized has been pure or substantially pure. No successful processes have yet been introduced in which the olefin content of a gas stream, which is rather dilute in olefins, has been successfully consumed to completion in the absence of some olefin concentration step or steps. By the use of the process of the present invention, such gas streams may be utilized per se as alkylating agents along with minor amounts of boron trifluoride and substantially complete conversions of the olefin content are obtained.

One embodiment of this invention relates to a process for the production of an alkylaromatic hydrocarbon which comprises passing to an alkylation zone containing a boron trifluoride modified substantially anhydrous inorganic oxide, alkylatable aromatic hydrocarbon, olefin-acting compound, and not more than 0.8 gram of boron trifluoride per gram mol of olefin-acting compound, reacting therein said alkylatable aromatic hydrocarbon with said olefin-acting compound at alkylation conditions in the presence of an alkylation catalyst comprising said boron trifluoride modified substantially anhydrous inorganic oxide, and recovering therefrom alkylated aromatic hydrocarbon.

Another embodiment of this invention relates to a process for the production of an alkylbenzene hydrocarbon which comprises passing to an alkylation zone containing boron trifluoride modified substantially anhydrous gamma-alumina, alkylatable benzene hydrocarbon, olefin, and not more than 0.8 gram of boron trifluoride per gram mol of olefin, reacting therein said alkylatable benzene hydrocarbon with said olefin at alkylation conditions in the presence of an alkylation catalyst comprising said boron trifluoride modified substantially anhydrous gamma-alumina, and recovering therefrom alkylated benzene hydrocarbon.

Still another embodiment of this invention relates to a process for the production of an alkylbenzene hydrocarbon which comprises passing to an alkylation zone containing boron trifluoride modified substantially anhydrous theta-alumina, alkylatable benzene hydrocarbon, olefin, and not more than 0.8 gram of boron trifluoride per gram mol of olefin, reacting therein said alkylatable benzene hydrocarbon with said olefin at alkylation conditions in the presence of an alkylation catalyst comprising said boron trifluoride modified substantially anhydrous theta-alumina, and recovering therefrom alkylated benzene hydrocarbon.

A specific embodiment of this invention relates to a process for the production of ethylbenzene which comprises passing to an alkylation zone containing boron trifluoride modified substantially anhydrous gamma-alumina, benzene, ethylene, and from about 0.001 gram to about 0.8 gram of boron trifluoride per gram mol of ethylene, reacting therein said benzene with said ethylene at alkylation conditions including a temperature of from about 0° to about 300° C. and a pressure of from about atmospheric to about 200 atmospheres in the presence of an alkylation catalyst comprising said boron trifluoride and boron trifluoride modified substantially anhydrous gamma-alumina, and recovering therefrom ethylbenzene.

A still further specific embodiment of this invention relates to a process for the production of cumene which comprises passing to an alkylation zone containing boron trifluoride modified substantially anhydrous gamma-alumina, benzene, propylene, and from about 0.001 gram to about 0.8 gram of boron trifluoride per gram mol of propylene, reacting therein said benzene with said propylene at alkylation conditions including a temperature of from about 0° to about 300° C. and a pressure of from about atmospheric to about 200 atmospheres in the presence of an alkylation catalyst comprising said boron trifluoride and boron trifluoride modified substantially anhydrous gamma-alumina, and recovering therefrom cumene.

We have found, when utilizing a catalyst comprising a boron trifluoride modified substantially anhydrous inorganic oxide, that the alkylation of aromatic hydrocarbons with olefin-acting compounds is surprisingly easy when boron trifluoride is supplied in a quantity not greater than 0.8 gram of boron trifluoride per gram mol of olefin-acting compound. The quantity of boron trifluoride utilized may be appreciably less than 0.8 gram per gram mol of olefin-acting compound and conversion of the olefin-acting compound to alkylaromatic hydrocarbon still observed. When the quantity of boron trifluoride utilized is greater than about 0.8 gram per gram mol of olefin-acting compound, side reactions begin to take place which convert the olefin-acting compound to other than the desired alkylaromatic hydrocarbon. With introduction of the boron trifluoride into the reaction zone in an amount within the range of 0.001 gram to 0.8 gram per gram mol of olefin-acting compound substantially complete conversion of the olefin-acting compound is obtained to produce desired alkylaromatic hydrocarbons, even when the olefin-acting compound is present as a so-called diluent in a gas stream the other components of which are inert under the reaction conditions and which other components decrease the partial pressure of the olefin present in the alkylation reaction zone. Furthermore, we have found that the use of a boron trifluoride modified substantially anhydrous inorganic oxide along with the limited quantities of boron trifluoride hereinabove described results in the attainment of completeness of reaction which has not been possible prior to this time. Furthermore, when the boron trifluoride modified substantially anhydrous gamma- or theta-alumina is present in the alkylation reaction zone, it has been found that the boron trifluoride may be added continuously, intermittently, or in some cases addition may be stopped, provided, of course, that the boron trifluoride added was never greater than 0.8 gram per gram mol of olefin-acting compound. Thus, the process may be started with boron trifluoride addition, for example, within the above set forth ranges, and the boron trifluoride addition discontinued. Depending whether or not the boron trifluoride modified substantially anhydrous gamma- or theta-alumina retains its activity, it may or may not be necessary to add further quantities of boron trifluoride within the above set forth ranges. This feature of the process of the present invention will be set forth more fully hereinafter.

Boron trifluoride is a gas (B.P. −101° C., M.P. −126° C.) which is readily soluble in most organic solvents. It may be utilized per se by merely bubbling into a reaction mixture or it may be utilized as a solution of the gas in an organic solvent such as the aromatic hydrocarbon to be alkylated, for example, benzene. Such solutions are within the generally broad scope of the use of a boron trifluoride catalyst in the process of the present invention although not necessarily with equivalent results. Gaseous boron trifluoride is preferred.

The preferred catalyst composition, as stated hereinabove, comprises boron trifluoride and boron trifluoride modified substantially anhydrous but not completely dry alumina. Of the various types of alumina which may be successfully and satisfactorily modified with boron trifluoride, two crystalline structures of alumina have been found to be particularly suitable. These crystalline structures are substantially anhydrous gamma-alumina and substantially anhydrous theta-alumina. The exact reason for the specific utility of these two crystalline alumina modifications in the process of this invention is not fully understood but it is believed to be connected with the number of residual hydroxyl groups on the surface of these two particular crystalline alumina modifications. It has been established, for example, that other crystalline alumina modifications such as gamma-alumina trihydrate ($Al_2O_3 \cdot 3H_2O$) or anhydrous alpha-alumina are less active and cannot be utilized in the process of this invention in the same manner as substantially anhydrous gamma-alumina and substantially anhydrous theta-alumina are used whenever complete olefin consumption is required. Modification of aluminas with boron trifluoride may be carried out prior to the addition of the alumina to the alkylation reaction zone or this modification may be carried out in situ. Furthermore, this modification of the alumina with boron trifluoride may be carried out prior to contact of these boron trifluoride modified aluminas with the aromatic hydrocarbon to be alkylated and the olefin-acting compound, or the modification may be carried out in the presence of the aromatic hydrocarbon to be alkylated, or in the presence of both the aromatic hydrocarbon to be alkylated and the olefin-acting compound. Obviously there is some limitation upon this last mentioned method of alumina modification. The modification of the above mentioned aluminas with boron trifluoride is an exothermic reaction and care must be taken to provide for proper removal of the resultant heat. The modification of the alumina is carried out by contacting the alumina with from about 2% to about 100% by weight boron trifluoride based on the alumina. In one manner of operation, the alumina is placed as a fixed bed in a reaction zone, which may be the alkylation reaction zone, and the desired quantity of boron trifluoride is passed therethrough. In such a case, the boron trifluoride may be utilized in so-called massive amounts or may be used in dilute form diluted with various other gases such as hydrogen, nitrogen, helium, etc. This contacting is normally carried out at room temperature although temperatures up to that to be utilized for the alkylation reaction, that is, temperatures up to about 300° C. may be used. With the preselected alumina at room temperature, utilizing boron trifluoride alone, a temperature wave will travel through the alumina bed during this modification of the alumina with boron trifluoride, increasing the temperature of the alumina from room temperature up to about 150° C. or more. As the boron trifluoride content of the gases to be passed over the alumina is diminished, this temperature increase also diminishes and can be controlled more readily in such instances. In another method for the modification of the above mentioned gamma- and theta-aluminas with boron trifluoride, the alumina may be placed as a fixed bed in the alkylation reaction zone, the boron trifluoride dissolved in the aromatic hydrocarbon to be alkylated, and the solution of aromatic hydrocarbon and boron trifluoride passed over the alumina at the desired temperature until sufficient boron trifluoride has modified the alumina. When the gas phase treatment of the alumina is carried out, it is noted that no boron trifluoride passes through the alumina bed until all of the alumina has been modified by the boron trifluoride. This same phenomena is observed during the modification of the alumina with the aromatic hydrocarbon solutions containing boron trifluoride. In another method, the modification of the alumina can be accomplished by utilization of a mixture of aromatic hydrocarbon to be alkylated, olefin-acting compound, and boron trifluoride which upon passage over the alumina forms the desired boron trifluoride modified alumina in situ. In the latter case, of course, the activity of the system is low initially and increases as the complete modification of the alumina with the boron trifluoride takes place. The exact manner by which the boron trifluoride modifies the alumina is not understood. It may be that the modification is a result of complexing of the boron trifluoride with the alumina, or on the other hand, it may be that the boron trifluoride reacts with residual hydroxyl groups on the alumina surface. It has been found at any particular preselected temperature for treatment of substantially anhydrous alumina, utilizing either the gamma- or theta-alumina modifications as set forth hereinabove, that the fluorine content of the treated aluminas attains a maximum which is not increased by further passage of boron trifluoride over the same. This maximum fluorine or boron trifluoride content of the alumina increases with temperature and depends upon the specific alumina selected. As stated hereinabove, the alumina treatment is, in the preferred embodiment, carried out at a temperature equal to or just greater than the selected reaction temperature so that the alumina will not necessarily tend to be modified further by the boron trifluoride which may be added in amounts not more than 0.8 gram per gram mol of olefin-acting compound during the process and so that control of the aromatic hydrocarbon alkylation reaction is attained more readily. In any case, the alumina resulting from any of the above mentioned boron trifluoride treatments is referred to herein in the specification and claims as boron trifluoride modified substantially anhydrous alumina.

Alumina is not the only inorganic oxide which is modified by boron trifluoride as hereinabove described. Other suitable inorganic oxides which are substantially but not completely anhydrous and which are to at least some degree modified by boron trifluoride include such various substances as silica, titanium dioxide, zirconium dioxide, chromia, zinc oxide, magnesia, calcium oxide, silica-alumina, silica-magnesia, silica-alumina-magnesia, silica-alumina-zirconia, chromia-alumina, alumina-boria, silica-zirconia, etc. It is necessary that the inorganic oxide utilized form a fairly stable compound with boron trifluoride from which the latter is not readily driven off by heat or reduced pressure. Of the above mentioned inorganic oxides, substantially but not completely anhydrous alumina is preferred, and particularly, synthetically prepared alumina of a high degree of purity consisting of substantially anhydrous gamma-alumina or substantially anhydrous theta-alumina.

This boron trifluoride modified alumina is utilized, as set forth hereinabove, along with not more than 0.8 gram of boron trifluoride per gram mol of olefin-acting compound. When the quantity of boron trifluoride modified alumina, along with boron trifluoride, is that needed for catalysis of the herein described reaction, the reaction takes place readily. When the desired reaction has been completed, the recovered boron trifluoride modified alumina is free flowing and changed solely from its original white color to a very light yellow color. Of course, the alumina contains quantities of boron and fluorine by analysis corresponding to that which will complex or react with the alumina in the manner described hereinabove under the temperature conditions utilized for the reaction.

As set forth hereinabove, the present invention relates to a process for the alkylation of an alkylatable aromatic hydrocarbon with an olefin-acting compound in the presence of a catalyst comprising a boron trifluoride modified substantially anhydrous inorganic oxide, and particularly in the presence of a catalyst comprising not more than 0.8 gram of boron trifluoride per gram mol of olefin-acting compound and a boron trifluoride modified substantially anhydrous alumina. Many aromatic hydrocarbons are utilizable as starting materials in the process of this invention. Preferred aromatic hydrocarbons are monocyclic aromatic hydrocarbons, that is, benzene hydrocarbons. Suitable aromatic hydrocarbons include benzene, toluene, ortho-xylene, meta-xylene, para-xylene, ethylbenzene, ortho-ethyltoluene, meta-ethyltoluene, para-ethyltoluene, 1,2,3,-trimethylbenzene, 1,2,4-trimethylbenzene, 1,3,5-trimethylbenzene or mesitylene, normal propylbenzene, isopropylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons within the scope of this invention as starting materials containing condensed benzene rings include naphthalene, alpha-methylnaphthalene, beta-methylnaphthalene, anthracene, phenanthrene, naphthacene, rubrene, etc. Of the above alkylatable aromatic hydrocarbons for use as starting materials in the process of this invention, the benzene hydrocarbons are preferred, and of the preferred benzene hydrocarbons, benzene itself is particularly preferred.

Suitable olefin-acting compounds or alkylating agents which may be charged in the process of this invention include monoolefins, diolefins, polyolefins, acetylenic hydrocarbons, and also alkyl chlorides, alkyl bromides, and alkyl iodides. The preferred olefin-acting compounds are olefinic hydrocarbons which comprise monoolefins having one double bond per molecule and polyolefins which have more than one double bond per molecule. Monoolefins which may be utilized as olefin-acting compounds or alkylating agents for alkylating alkylatable aromatic hydrocarbons in the presence of the hereinabove described catalyst are either normally gaseous or normally liquid and include ethylene, propylene, 1-butene, 2-butene, isobutylene, and higher normally liquid olefins such as pentenes, hexenes, heptenes, octenes, and higher molecular weight liquid olefins, the latter including various olefin polymers having from about 6 to about 18 carbon atoms per molecule such as propylene trimer, propylene tetramer, propylene pentamer, isobutylene dimer, isobutylene trimer, isobutylene tetramer, etc. Cycloolefins such as cyclopentene, methylcyclopentene, cyclohexene, methylcyclohexene, may be utilized, but generally not under the same conditions of operation applying to non-cyclic olefins. The polyolefinic hydrocarbons utilizable in the process of this invention include conjugated diolefins such as butadiene and isoprene, as well as non-conjugated diolefins and other polyolefinic hydrocarbons containing two or more double bonds per molecule. Acetylene and homologs thereof are also useful olefin-acting compounds.

As stated hereinabove, alkylation of the above alkylatable aromatic hydrocarbons may also be effected in the presence of the hereinabove referred to catalyst by reacting aromatic hydrocarbons with certain substances capable of producing olefinic hydrocarbons, or intermediates thereof, under the conditions of operation chosen for the process. Typical olefin producing substances capable of use include alkyl chlorides, alkyl bromides, and alkyl iodides capable of undergoing dehydrohalogenation to form olefinic hydrocarbons and thus containing at least two carbon atoms per molecule. Examples of such alkyl halides include ethyl chloride, normal propyl chloride, isopropyl chloride, normal butyl chloride, isobutyl chloride, secondary buty chloride, teritary butyl chloride, amyl chlorides, hexyl chlorides, etc., ethyl bromide, normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

As stated hereinabove, olefin hydrocarbons, especially normally gaseous olefin hydrocarbons, are particularly preferred olefin-acting compounds or alkylating agents for use in the process of the present invention. As stated, the process can be successfully applied to and utilized for conversion of olefin hydrocarbons when these olefin hydrocarbons are present in minor quantities in gas streams. Thus, in contrast to prior art processes, the normally gaseous olefin hydrocarbon for use in the process of the present invention, need not be purified or concentrated. Such normally gaseous olefin hydrocarbons appear in minor concentrations in various refinery gas streams, usually diluted with various unreactive gases such as hydrogen, nitrogen, methane, ethane, propane, etc. These gas streams containing minor quantities of olefin hydrocarbon are obtained in petroleum refineries from various refinery installations including thermal cracking units, catalytic cracking units, thermal reforming units, coking units, polymerization units, etc. Such refinery gas streams have in the past often been burned for fuel value since an economical process for their utilization as alkylating agents or olefin-acting compounds has not been available except where concentration of the olefin hydrocarbons has been carried out concurrently therewith. This is particularly true for refinery gas streams containing relatively minor quantities of olefin hydrocarbons such as ethylene. Thus, it has been possible catalytically to polymerize propylene and/or various butenes in refinery gas streams but the off-gases from such processes still contain ethylene. Prior to our invention it has been necessary to purify and concentrate this ethylene or to use it for fuel. These refinery gas streams containing minor quantities of olefin hydrocarbons are known as off-gases. In addition to containing minor quantities of olefin hydrocarbons such as ethylene, propylene, and the various butenes, depending upon their source, they contain varying quantities of nitrogen, hydrogen, and various normally gaseous paraffinic hydrocarbons. Thus, a refinery off-gas ethylene stream may contain varying quantities of hydrogen, nitrogen, methane, and ethane with the ethylene in minor proportion, while a refinery off-gas propylene stream is normally diluted with propane and contains the propylene in minor quantities, and a refinery off-gas butene stream is normally diluted with butanes and contains the butenes in minor quantities. A typical analysis in mol percent for a utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7%; and $C_4$ hydrocarbons, 0.5%. It is readily observed that the total olefin content of this gas stream is 16.7 mol percent and the ethylene content is even lower, namely 10.3 mol percent. Such gas streams containing olefin hydrocarbons in minor or dilute quantities are particularly preferred alkylating agents or olefin-acting compounds within the broad scope of the present invention. It is readily apparent that only the olefin content of such gas streams undergoes reaction in the process of this invention, and that the remaining gases free from olefin hydrocarbons are vented from the process.

In accordance with the process of the present invention, the alkylation of alkylatable aromatic hydrocarbons with olefin-acting compounds reaction to produce alkylated aromatic hydrocarbons of higher molecular weight than those charged to the process is effected in the presence of the above indicated catalyst at a temperature of from about 0° C. or lower to about 300° C. or higher, and preferably from about 20° to about 230° C., although the exact temperature needed for a particular aromatic hydrocarbon alkylation reaction will depend upon the alkylatable aromatic hydrocarbon and olefin-acting compound employed. The alkylation reaction is usually carried out at a pressure of from about substantially atmospheric to about 200 atmospheres. The pressure utilized is usually selected to maintain the alkylatable aromatic hydrocarbon in substantially liquid phase. Within the above temperature and pressure ranges, it is not always possible to maintain the olefin-acting compound in liquid phase. Thus, when utilizing a refinery off-gas containing minor quantities of ethylene, the ethylene will be dissolved in the liquid phase alkylatable aromatic hydrocarbon to the extent governed by temperature, pressure, and solubility considerations. However, a portion thereof undoubtedly will be in the gas phase. When possible, it is preferred to maintain all of the reactants in liquid phase. Such is not always possible, however, as set forth hereinabove. Referring to the aromatic hydrocarbon subjected to alkylation, it is preferable to have present from 2 to 10 or more, sometimes up to 20, molecular proportions of alkylatable aromatic hydrocarbon per one molecular proportion of olefin-acting compound introduced therewith to the alkylation zone. The higher molecular ratios of alkylatable aromatic hydrocarbon to olefin are particularly necessary when the olefin employed in the alkylation process is a high molecular weight olefin boiling generally higher than pentenes, since these olefins frequently undergo depolymerization prior to or substantially simultaneously with alkylation so that one molecular proportion of such an olefin can thus alkylate two or more molecular proportions of the akylatable aromatic hydrocarbon. The higher molecular ratios of alkylatable aromatic hydrocarbon to olefin also tend to reduce the formation of polyalkylated products because of the operation of the law of mass action under these conditions.

In converting aromatic hydrocarbons to effect alkylation thereof with the type of catalysts herein described, either batch or continuous operations may be employed. The actual operation of the process admits of some modification depending upon the normal phase of the reacting constituents, whether the catalyst utilized is not more than 0.8 gram of boron trifluoride per gram mol of olefin-acting compound along with a boron trifluoride modified alumina, or said boron trifluoride modified alumina alone, and whether batch or continuous operations are employed. In one type of batch operation, an aromatic hydrocarbon to be alkylated, for example benzene, is brought to a temperature and pressure within the approximate range specified in the presence of a catalyst comprising boron trifluoride and boron trifluoride modified substantially anhydrous gamma-alumina having a concentration corresponding to a sufficiently high activity and alkylation of the benzene is effected by the gradual introduction under pressure of an olefin such as ethylene, in a manner to attain contact of the catalyst and reactants and in a quantity so that the amount of boron trifluoride utilized is from about 0.001 gram to about 0.8 gram per gram mol of olefin. After a sufficient time at the desired temperature and pressure, the gases, if any, are vented and the alkylated aromatic hydrocarbon separated from the reaction products.

In another manner of operation, the aromatic hydrocarbon may be mixed with the olefin at a suitable temperature in the presence of sufficient boron trifluoride modified alumina, and boron trifluoride is then added to attain an amount between from about 0.001 gram to about 0.8 gram per gram mol of olefin. Then, reaction is induced by sufficiently long contact time with the catalyst. Alkylation may be allowed to progress to different stages depending upon contact time. In the case of the alkylation of benzene with normally gaseous olefins, the most desirable product is that obtained by the utilization in the process of molar quantities of benzene exceeding those of the olefin. In a batch type of operation, the amount of boron trifluoride modified alumina utilized will range from about 1% to about 50% by weight based on the aromatic hydrocarbon. With this quantity of boron trifluoride modified alumina, and boron trifluoride as set forth hereinabove, the contact time may be varied from about 0.1 to about 25 hours or more. Contact time is not only dependent upon the quantity of catalyst utilized but also upon the efficiency of mixing, shorter contact times being attained by increasing mixing. After batch treatment, the boron trifluoride component of the catalyst is removed in any suitable manner, such as by venting or caustic washing, the organic layer or fraction is decanted or filtered from the boron trifluoride modified alumina, and the organic product or fraction is then subjected to separation such as by fractionation for the recovery of the desired reaction product or products.

In one type of continuous operation, a liquid aromatic hydrocarbon, such as benzene, containing dissolved therein the requisite amount of boron trifluoride, may be pumped through a reactor containing a bed of solid boron trifluoride modified alumina. The olefin-acting compound may be added to the aromatic hydrocarbon stream prior to contact of this stream with the solid alumina bed, or it may be introduced at various points in the alumina bed, and it may be introduced continuously or intermittently, as set forth above. In this type of an operation, the hourly liquid space velocity of the aromatic hydrocarbon reactant will vary from about 0.25 to about 20 or more. The details of continuous processes of this general character are familiar to those skilled in the alkylation of aromatic hydrocarbons art and any necessary additions or modifications of the above general procedures will be more or less obvious and can be made without departing from the broad scope of this invention.

The process of the present invention is illustrated by the following examples which are introduced for the purpose of illustration and with no intention of unduly limiting the generally broad scope of this invention.

EXAMPLE I

This example illustrates the effectiveness of the process of the present invention utilizing a catalyst comprising a boron trifluoride modified substantially anhydrous theta-alumina for the alkylation of benzene with ethylene containing various inert diluents. The experiments were conducted in a once-through bench scale processing unit consisting of liquid and gas charge pumps, reaction tube, high pressure gas separator, pressure controller, and liquid and gas collection systems. The reactor effluent was collected in the high pressure separator at reactor pressure. Boron trifluoride was metered into the reaction system continuously from a charger under pressure.

The reaction tube was charged with substantially anhydrous theta-alumina prepared from 1/16" diameter alumina spheres. The alumina spheres were dried for 17 hours at 200° C. and then calcined at 1200° C. for two hours. X-ray diffraction analyses indicated the resulting material to be substantially all theta-alumina. The theta-alumina had the following physical properties: surface area, 53 square meters per gram; pore volume, 0.234 cubic centimeter per gram; pore diameter, 177 A.; and apparent bulk density, 0.725 gram per milliliter. Sixty milliliters (43.5 grams) of the theta-alumina was charged to the reactor.

The benzene utilized in the following experiments was dried in storage over calcium chloride. The composition of the synthetic off-gas feed is as follows: 25.2 mol percent nitrogen, 0.2 mol percent carbon monoxide, 25.3 mol percent hydrogen, 27.6 mol percent methane, 21.3 mol percent ethylene, and 0.4 mol percent ethane. Prior to contacting the theta-alumina with the hydrocarbons, the reactor containing the theta-alumina was slowly pressured to 50 p.s.i.g. with 6 grams of boron trifluoride. A temperature wave, increasing from the ambient temperature up to about 58° C., traveled through the alumina bed during this initial addition of the boron trifluoride. The boron trifluoride was in contact with the theta-alumina for a time of about one hour. Then, the reaction temperature was increased to 150° C., and the ethylene feed was pressured into the reactor to the pump intake pressure (400 p.s.i.g.). Thereafter, both the benzene and ethylene pumps were started, the reactor pressure was increased to the 500 p.s.i.g. operating pressure, and the input of boron trifluoride was started. The operating conditions utilized included a temperature of 150° C., a pressure of 500 p.s.i.g., a benzene to ethylene mol ratio of about 5.5, and a benzene liquid hourly space velocity of about 1.5. The boron trifluoride input was varied from 1.5 grams per gram mol of ethylene down to 0.20 gram per mol of ethylene. The operating conditions utilized and the results obtained in a 210 hour run are summarized in the following Table I:

*Table 1*

ALKYLATION OF BENZENE WITH SYNTHETIC CAT-CRACKER OFF-GAS IN THE PRESENCE OF BF$_3$ AND BF$_3$-MODIFIED THETA-Al$_2$O$_3$

| Tests | Charge | 1 | 2 | 3 | 4 | 5 |
|---|---|---|---|---|---|---|
| Accumulated Hours | | 18–45.8 | 45.8–73.8 | 73.8–92.8 | 92.8–116 | 177.4–209.4 |
| Diluents in C$_2$H$_4$ Feed | | | | N$_2$+H$_2$+CH$_4$ | | |
| Solid Catalyst Component | | | | BF$_3$ modified theta-Al$_2$O$_3$ | | |
| BF$_3$ Input, gms./mol C$_2$H$_4$ charged | | 1.50 | 0.88 | 0.45 | 0.20 | 0.54 |
| Benzene/C$_2$H$_4$, Mol Ratio | | 5.2 | 5.6 | 5.5 | 5.3 | 5.3 |
| Temperature, °C | | 150 | 150 | 150 | 150 | 150 |
| Pressure, p.s.i.g | | 500 | 500 | 500 | 500 | 500 |
| Charge Rates, ml./hr.: | | | | | | |
| Benzene | | 90 | 90 | 90 | 90 | 90 |
| C$_2$H$_4$ Stream @ 500 p.s.i.g.+150°C | | 875 | 875 | 875 | 875 | 875 |
| LHSV, Benzene | | 1.50 | 1.50 | 1.50 | 1.50 | 1.50 |
| High Pressure Separator Gas, Mol percent: | | | | | | |
| N$_2$ | 25.2 | 35.7 | 34.9 | 34.4 | 32.8 | 36.4 |
| CO | 0.2 | 0.2 | 0.2 | 0.3 | 0.5 | 0 |
| H$_2$ | 25.3 | 25.8 | 28.2 | 30.6 | 32.9 | 29.1 |
| CH$_4$ | 27.6 | 33.1 | 32.9 | 32.4 | 32.6 | 32.5 |
| C$_2$H$_4$ | 21.3 | Tr | Tr | 0 | 0 | 1.2 |
| C$_2$H$_6$ | 0.4 | 5.0 | 3.5 | 2.0 | 0.9 | 0.4 |
| C$_6$H$_6$ | 0 | 0.2 | 0.3 | 0.3 | 0.3 | 0.4 |
| Ethylene reacted, Wt. Percent | | 99.8 | 99.8 | | 99.8 | 99.8 |
| Product Yield, gms./gm. C$_2$H$_4$ charged: | | | | | | |
| Ethylbenzene | | 1.73 | 1.82 | | 2.04 | |
| Diethylbenzenes | | 0.34 | 0.33 | | 0.41 | |
| Higher Boiling | | 0.19 | 0.19 | | 0.21 | |
| Product Yield, gms./gm. C$_6$H$_6$ charged: Ethylbenzene | | 1.61 | 1.35 | | 1.30 | |
| Ethylbenzene, Ultimate Yield: | | | | | | |
| gms./gm. C$_2$H$_4$ | | 2.34 | 2.42 | | 2.78 | |
| Percent of Theory | | 62 | 64 | | 74 | |

From the above table it is observed that at a boron trifluoride addition rate of 1.50 grams of boron trifluoride per gram of ethylene, all of the ethylene was removed from the charge gas. At this boron trifluoride addition rate, the once-through yield of ethylbenzene was 1.73 grams per gram of ethylene charged. Some of the ethylene went to form diethylbenzene, the yield of which was 0.34 gram per gram of ethylene. The ethylene which was not accounted for as alkylaromatic hydrocarbons was converted to ethane. About 5.0 mol percent ethane was found in the high pressure separator gas. A substantial reduction in hydrogen concentration occurred simultaneously. In going from Test 1 to Test 2, as the amount of boron trifluoride input was decreased from 1.50 grams of boron trifluoride to 0.88 gram of boron trifluoride per gram mol of ethylene charged, less ethane was produced and a greater yield of ethylbenzene and higher boiling alkyl aromatics was observed. Then in going from Test 2 to Test 3, reducing the amount of boron trifluoride further to 0.45 gram of boron trifluoride per gram mol of ethylene decreased the ethane production (and increased the yield of ethylbenzene). In going from Test 3 to Test 4, further reduction of the boron trifluoride input to 0.20 gram per gram mol of ethylene, reduced the ethane content of the high pressure separator gas to a value equivalent to its original content of the feed, along with a simultaneous increase in yield of ethylbenzene. Test 5 shows that at the end of 210 hours on stream the weight percent ethylene reacted was still 99% and the ethane content of the high pressure separator gas was the same as the gas feed.

Infrared analyses of the 130–140° C. fractions of the liquid products indicated 100% ethylbenzene; no other absorption bands due to $C_6$–$C_8$ aromatics were detected. Organic fluoride content of these ethylbenzene fractions was less than 10 p.p.m. As shown in Table I, the amount of diethylbenzenes increased with the yield of ethylbenzene fraction. These diethylbenzenes can be recycled to obtain alkyl transfer and thus increase the ultimate yield of ethylbenzene.

These data show that the completeness of ethylene removal from the off-gas is dependent upon the input of boron trifluoride. If too much boron trifluoride is employed, ethylene is converted to ethane and thus the ultimate yield of ethylbenzene is reduced. When the gas stream of 21.4% concentration is supplied to the reaction zone under the same conditions shown in this example, but without any introduction of boron trifluoride into the reaction zone, conversion to alkylated aromatics drops off. At favorable conditions, Test 4, where the boron trifluoride input was 0.20 gram per gram mol of ethylene and where a 2.04 gram yield of ethylbenzene fraction was obtained per gram of ethylene charged, 0.007 gram of boron trifluoride were fed per gram of ethylene charged. This is equivalent to an input of 0.0034 gram of boron trifluoride per gram of ethylbenzene produced. Appreciably all of the boron trifluoride input can be recovered from the reactor effluent.

The recovered theta-alumina after about 210 hours of operation was free flowing and changed from a white to a light yellow color. Based on the weight of the used alumina, the normal pentane soluble content of the alumina equalled 0.52% and the ether soluble material, after hydrolysis, equalled 0.10%.

Under the above described operating conditions, benzene consumption amounted to about 1.2 mols per mol of ethylbenzene produced. This figure is based upon the difference between benzene charged and recovered and thus a small error due to benzene loss in various portions of the apparatus magnifies the quantity. A more favorable ratio of benzene to ethylene, namely about 7 to 10 instead of the present 5, increases monoalkylation and reduces benzene consumption. As stated above, recycle of the polyethylbenzene fraction to the reactor for alkyl transfer also reduces benzene consumption.

EXAMPLE II

This example illustrates the alkylation of benzene with a synthetic off-gas similar to that normally observed from a catalytic cracking unit. This experiment was carried out with a catalyst comprising from about 0.52 to about 0.74 gram of boron trifluoride per gram mol of olefin and in the presence of a boron trifluoride modified gamma-alumina. The once-through bench scale processing unit described in Example I was also utilized for the experiment described in this example. Boron trifluoride was added to the reactants in this example as a 15–16% mixture in dry nitrogen.

The reaction tube was charged with gamma-alumina prepared from $\frac{1}{16}''$ diameter alumina spheres. The alumina spheres were dried 117 hours at 220° C. and calcined at 680° C. for two hours. X-ray diffraction analyses indicated the resulting material to be substantially anhydrous gamma-alumina. This gamma-alumina had the following physical properties: surface area, 181 square meters per gram; pore volume, 0.650 cubic centimeter per gram; pore diameter, 144 A.; and apparent bulk density, 0.490 gram per milliliter. Sixty milliliters (29.4 grams) of gamma-alumina were charged to the reactor.

The benzene utilized in this experiment was dried over calcium chloride. The composition of the synthetic off-gas feed is as follows: carbon dioxide, 0.1 mol percent; nitrogen, 29.0 mol percent; carbon monoxide, 1.3 mol percent; hydrogen, 18.9 mol percent; methane, 35.0 mol percent; ethylene, 12.0 mol percent; ethane, 0.5 mol percent; propylene, 2.5 mol percent; propane, 0.1 mol percent; isobutane, 0.1 mol percent; and acetylene, 0.5 mol percent. Prior to contacting of the gamma-alumina with the hydrocarbons, the reactor containing the gamma-alumina was slowly pressured to 50 p.s.i.g. with 5 grams of boron trifluoride. A temperature wave, an increase from room temperature up to about 170° C., traveled through the alumina bed during the initial addition of the boron trifluoride. The boron trifluoride was in contact with the gamma-alumina for one hour. Then the reaction temperature was increased to 150° C. and the operation commenced. The operating conditions utilized included a temperature of 150° C., a pressure of 600 p.s.i.g., a benzene to olefin mol ratio of 7.78, and a benzene liquid hourly space velocity of about 1.5. The boron trifluoride input which was started just prior to addition of the hydrocarbons varied from 0.52 gram to 0.74 gram per gram mol of olefin. Since the feed gas in this example contained ethylene, propylene, and acetylene, the aromatic to olefin ratio and the quantity of boron trifluoride input have taken this total unsaturation into account.

The experiment was continued for about 96.5 hours during which time 7523 grams of benzene were charged. Taking only the olefin content of the gas feed into account, there was charged during this same time 289.8 grams of ethylene, 90.4 grams of propylene, and 11.2 grams of acetylene. The total weight of reactants charged was 7914.4 grams. During this 96.5 hours, the vent gas was free from unsaturated hydrocarbons, in other words, all of the ethylene, propylene, and acetylene charged reacted with the benzene. Over the 96.5 hour period there was recovered 7098 grams of reactor effluent in the low pressure separator and the vent gases containing 739 grams of benzene, giving a recovery of 7337 grams or just over 99 weight percent recovery.

The product liquid effluent was tested for unsaturation and found to have a bromine index of 5, indicating the substantial absence of olefin polymerization products. Ethylbenzene was produced in the quantity of 2.44 grams per gram of ethylene charged representing 64.4% of the theoretical yield on a once-through basis. There was also obtained 0.39 gram of diethylbenzene per gram of ethylbenzene charged. Taking into account recycling of this diethylbenzene, the ultimate yield of ethylbenzene based upon ethylene charged is 85.2% of the theoretical quantity. Cumene was produced in the quantity of 2.16 grams per gram of propylene charged representing a 75.8% theoretical yield on a once-through basis. There was also produced 0.10 gram of diisopropylbenzene per gram of propylene charged. If this amount of diisopropylbenzene is taken into account for recycle purposes, there is attained an ultimate yield of cumene of 82.6% of the theoretical quantity. At the same time, 6.45 grams of 1,1-diphenylethane were produced per gram of acetylene charged. This represents a once-through yield of 93% of the theoretical quantity based on acetylene.

The above results indicate that high yields of alkylated aromatic hydrocarbons are produced by utilization of the process of the present invention in the presence of quantities of boron trifluoride ranging from about 0.001 gram to about 0.8 gram per gram mol of olefin charged.

EXAMPLE III

This example illustrates the alkylation of benzene with a dilute gas stream in the presence of about 0.1 gram of boron trifluoride per gram mol of olefin. The reaction tube was again packed with boron trifluoride modified gamma-alumina. The same once-through bench scale processing unit described in Example I was also utilized for the experiment described in this example. Boron trifluoride was added to the reactants in this example as a 3% mixture in dry nitrogen.

The reaction tube was charged with 60 milliliters (29.4 grams) of the same gamma-alumina described in Example II. This gamma-alumina had the same physical properties as set forth hereinabove. The benzene utilized in this experiment was dried over calcium chloride. The composition of the dilute olefin stream is as follows: nitrogen, 83.3 mol percent; ethylene, 13.5 mol percent; and propylene, 3.2 mol percent. Prior to the contacting of the gamma-alumina with the hydrocarbons, the reactor containing the gamma-alumina was slowly pressured to 50 p.s.i.g. with 5 grams of boron trifluoride. A temperature wave traveled through the alumina bed during the initial addition of the boron trifluoride with a peak temperature of about 150° C. being attained. The boron trifluoride was in contact with the gamma-alumina for one hour. Then, heat input to the reaction tube was commenced and a processing operation started. The operating conditions utilized included a temperature of 125° C., a pressure of 600 p.s.i.g., a benzene to olefin mol ratio of about 7:1, and a benzene liquid hourly space velocity varying from 0.75 to 2.5. The boron trifluoride input which was started just prior to the input of the hydrocarbons varied from 0.109 to 0.125 gram per gram mol of olefin.

A summary of three tests carried out at these varying hourly liquid space velocities is presented in the following Table II:

*Table II*

ALKYLATION OF BENZENE WITH OLEFINS DILUTED WITH NITROGEN IN THE PRESENCE OF BF$_3$ AND BF$_3$-MODIFIED GAMMA-ALUMINA

| Test | 6 | 7 | 8 |
|---|---|---|---|
| Accumulated Hours | 36-68 | 76-96 | 108-123 |
| Solid Catalyst Component | BF$_3$-Modified Gamma-Alumina | | |
| BF$_3$ Input, gms./mol olefin | 0.109 | 0.119 | 0.125 |
| Benzene/Olefin, mol ratio | 6.82 | 6.75 | 6.65 |
| Temperature, °C | 125 | 125 | 125 |
| LHSV, Benzene | 0.75 | 1.48 | 2.47 |
| Charge, gms.: | | | |
| Ethylene | 54.1 | 67.1 | 85.7 |
| Propylene | 19.2 | 23.9 | 30.5 |
| Benzene | 1,269.6 | 1,561.3 | 1,963.2 |
| Total | 1,342.9 | 1,652.3 | 2,079.4 |
| Recovery, gms.: | | | |
| Unreacted olefin | 0 | 0 | 0 |
| Hydrocarbons | 1,330.2 | 1,649.9 | 2,102.2 |
| Weight Percent Recovery | 99.1 | 99.9 | 101.1 |
| Results: | | | |
| Ethylene Conversion, Percent | 100 | 100 | 100 |
| Propylene Conversion, Percent | 100 | 100 | 100 |
| Converted Ethylene, Percent Recovered as: | | | |
| Ethylbenzene | 73.1 | 74.0 | 59.5 |
| Diethylbenzene | 19.6 | 18.4 | 19.8 |
| Polyethylbenzene | 7.3 | 7.6 | 20.7 |
| Converted Propylene, Percent Recovered as: | | | |
| Cumene | 92.7 | 91.4 | 92.5 |
| Di- and Polypropylbenzene | 7.3 | 8.6 | 7.5 |

In each of the above tests the weight percent recovery was within experimental error. Complete olefin conversion was obtained in each of the tests although a change in the type of products produced was observed with increasing space velocity, particularly in relation to the ethylbenzene product. The once-through conversion of ethylene to ethylbenzene was about 73-74% in Tests 6 and 7 at benzene liquid hourly space velocities of 0.75 and 1.5 but decreased to about 60% as the space velocity was raised further to 2.5. Higher ultimate yields of monoalkylated aromatic hydrocarbons can be produced, as set forth hereinabove, by recycle of di- and polyalkyl compounds.

The above results indicate satisfactory conversion to alkylaromatic hydrocarbons by the process of this invention utilizing extremely small quantities of boron trifluoride in conjunction with boron trifluoride modified gamma-alumina as the catalyst at hourly liquid space velocities most economical for commercial operation.

EXAMPLE IV

This example illustrates the alkylation of benzene with ethylene and propylene diluted with an inert gas. This experiment was carried out in an effort to determine, among other things, the optimum minimum quantities of boron trifluoride which could be utilized as added boron trifluoride when processing over a solid catalyst component comprising boron trifluoride modified gamma-alumina. The same once-through bench scale processing unit described in Example I was utilized for the experiment described in this example. As in Example III, the boron trifluoride was added as a 3% mixture in dry nitrogen.

The reaction tube was charged with 30 milliliters (14.7 grams) of another sample of the gamma-alumina described in Example II. This gamma-alumina had the same physical properties as set forth hereinabove.

The benzene utilized in this experiment was again dried over calcium chloride. The composition of the dilute olefin stream utilized as the alkylating agent for Tests 9 through 11 is as follows: nitrogen, 85.7 mol percent; ethylene, 11.7 mol percent; and propylene, 2.6 mol percent. In Tests 12 through 14 this composition varied slightly to the following: nitrogen, 85.1 mol percent; ethylene, 12.0 mol percent; and propylene, 2.9 mol percent. Prior to the contacting of the gamma-alumina with the hydrocarbons, the reactor containing the gamma-alumina was slowly pressured to 50 p.s.i.g. with 2.5 grams of boron trifluoride. A temperature wave traveled through the alumina bed during the initial addition of the boron trifluoride and a peak temperature of about 150° C. was observed. The boron trifluoride was in contact with the gamma-alumina for one hour. Then, heating of the reaction tube was commenced and the processing operation started. The operating conditions utilized included a temperature of 125° C., a pressure of 600 p.s.i.g., a benzene to olefin mol ratio of about 8:1, and a benzene liquid hourly space velocity varying from 2.5 to about 8.0. The boron trifluoride input was started just prior to addition of the hydrocarbons and was varied from 0.149 down to 0.011 gram of boron trifluoride per gram mol of olefin.

A summary of six tests carried out at varying liquid hourly space velocities and with varying boron trifluoride inputs is presented in the following Table III.

Tests 9, 10, and 11 show the effect of increasing space velocity at constant addition ratio of boron trifluoride based upon the mols of olefin in the feed. In contrast to the test described in Example III, these tests show very little further decrease in monoethylbenzene production with increasing space velocity. This same observation can also be made for the yields of cumene and of di- and polyalkylated alkylaromatic hydrocarbons. The weight percent recoveries in each of the above tests was within experimental error as is true for Tests 12 through 14 in the table.

Table III

ALKYLATION OF BENZENE WITH OLEFINS DILUTED WITH NITROGEN IN THE PRESENCE OF BF₃ AND BF₃-MODIFIED GAMMA-ALUMINA

| Test | 9 | 10 | 11 | 12 | 13 | 14 |
|---|---|---|---|---|---|---|
| Accumulated Hours | 21–61 | 75–93 | 101–117 | 125–141 | 149–165 | 173–189 |
| Solid Catalyst Component | | | BF₃-Modified Gamma-Alumina | | | |
| BF₃ Input, gms./mol olefin | 0.106 | 0.149 | 0.122 | 0.055 | 0.025 | 0.011 |
| Benzene/Olefin, mol ratio | 7.80 | 7.76 | 7.99 | 7.67 | 7.60 | 7.71 |
| Temperature, °C | 125 | 125 | 125 | 125 | 125 | 125 |
| LHSV, Benzene | 2.51 | 3.98 | 7.99 | 7.92 | 7.93 | 7.93 |
| Charge, gms.: | | | | | | |
| Ethylene | 100.0 | 71.8 | 123.9 | 126.1 | 127.6 | 125.4 |
| Propylene | 33.3 | 24.1 | 41.6 | 46.5 | 46.6 | 46.4 |
| Benzene | 2,652.5 | 1,897.4 | 3,374.9 | 3,354.7 | 3,356.0 | 3,357.8 |
| Total | 2,785.8 | 1,993.3 | 3,540.4 | 3,527.3 | 3,530.2 | 3,529.6 |
| Recovery, gms.: | | | | | | |
| Unreacted olefin | 0 | 0.4 | 1.0 | 2.0 | 1.0 | 2.3 |
| Hydrocarbons | 2,789.9 | 2,008.5 | 3,559.1 | 3,569.2 | 3,571.4 | 3,564.7 |
| Weight Percent Recovery | 100.1 | 100.8 | 100.5 | 101.2 | 101.2 | 101.0 |
| Results: | | | | | | |
| Ethylene Conversion, Percent | 100 | 99.4 | 99.2 | 98.4 | 99.2 | 98.2 |
| Propylene Conversion, Percent | 100 | 100 | 100 | 100 | 100 | 100 |
| Converted Ethylene, Percent Recovered as: | | | | | | |
| Ethylbenzene | 60.0 | 57.1 | 60.2 | 62.2 | 57.4 | 63.9 |
| Diethylbenzene | 23.0 | 21.3 | 18.1 | 20.3 | 17.8 | 19.6 |
| Polyethylbenzene | 17.0 | 21.6 | 21.7 | 17.5 | 24.8 | 16.5 |
| Converted Propylene, Percent Recovered as: | | | | | | |
| Cumene | 88.5 | 83.6 | 92.6 | 84.8 | 87.9 | 85.6 |
| Di- and Polypropylbenzene | 11.5 | 16.4 | 7.4 | 15.2 | 12.1 | 14.4 |

As set forth hereinabove, the analysis of the gas feed in Tests 12 through 14 was somewhat different than in Tests 9 through 11. Test 12 differs from Test 11 in that the boron trifluoride input is about cut in half. Substantially the same results were still obtained. In Test 13 the boron trifluoride input was again cut in half and the results apparently remain constant. In Test 14 the boron trifluoride input was again cut in half from the previous test, down to 0.011 gram per gram mol of olefin, and the olefin conversion remained complete. This operation includes olefin conversion at a steady rate, and production of mono- and dialkylaromatic hydrocarbons in substantially the same amounts as with larger quantities of boron trifluoride. The yields based upon the weight percent recovery in these three tests were also within experimental error.

When no boron trifluoride is added, some unreacted olefins begin to appear in the vent gases from the plant and conversion to desired products drops off. This is indicative of the necessity for an amount of boron trifluoride addition of not more than 0.8 gram per gram mol of olefin. When this amount of boron trifluoride addition is exceeded, as shown in Example I, olefin conversion to other products such as paraffins occurs.

We claim as our invention:

1. A process for the production of an alkylaromatic hydrocarbon which comprises passing to an alkylation zone containing boron trifluoride modified substantially anhydrous alumina selected from the group consisting of gamma-alumina and theta-alumina, alkylatable aromatic hydrocarbon, olefin-acting compound, and not more than 0.8 gram of boron trifluoride per gram mol of olefin-acting compound, reacting therein said alkylatable aromatic hydrocarbon with said olefin-acting compound at alkylation conditions in the presence of an alkylation catalyst comprising said boron trifluoride modified alumina, and recovering therefrom alkylated aromatic hydrocarbon.

2. A process for the production of an alkyl-aromatic hydrocarbon which comprises passing to an alkylation zone containing boron trifluoride modified substantially anhydrous gamma-alumina, alkylatable aromatic hydrocarbon, olefin-acting compound, and not more than 0.8 gram of boron trifluoride per gram mol of olefin-acting compound, reacting therein said alkylatable aromatic hydrocarbon with said olefin-acting compound at alkylation conditions in the presence of an alkylation catalyst comprising said boron trifluoride modified gamma-alumina, and recovering therefrom alkylated aromatic hydrocarbon.

3. A process for the production of an alkyl-aromatic hydrocarbon which comprises passing on an alkylation zone containing boron trifluoride modified substantially anhydrous theta-alumina, alkylatable aromatic hydrocarbon, olefin-acting compound, and not more than 0.8 gram of boron trifluoride per gram mol of olefin-acting compound, reacting therein said alkylatable aromatic hydrocarbon with said olefin-acting compound at alkylation conditions in the presence of an alkylation catalyst comprising said boron trifluoride modified theta-alumina, and recovering therefrom alkylated aromatic hydrocarbon.

4. A process for the production of an alkyl-aromatic hydrocarbon which comprises passing to an alkylation zone containing boron trifluoride modified substantially anhydrous gamma-alumina, alkylatable aromatic hydrocarbon, unsaturated hydrocarbon, and not more than 0.8 gram of boron trifluoride per gram mol of unsaturated hydrocarbon, reacting therein said alkylatable aromatic hydrocarbon with said unsaturated hydrocarbon at alkylation conditions in the presence of an alkylation catalyst comprising said boron trifluoride modified gamma-alumina, and recovering therefrom alkylated aromatic hydrocarbon.

5. A process for the production of an alkyl-aromatic hydrocarbon which comprises passing to an alkylation zone containing boron trifluoride modified substantially anhydrous theta-alumina, alkylatable aromatic hydrocarbon, unsaturated hydrocarbon, and from about 0.001 gram to about 0.8 gram of boron trifluoride per gram mol of unsaturated hydrocarbon, reacting therein said alkylatable aromatic hydrocarbon with said unsaturated hydrocarbon at alkylation conditions in the presence of an alkylation catalyst comprising said boron trifluoride modified theta-alumina, and recovering therefrom alkylated aromatic hydrocarbon.

6. A process for the production of an alkylaromatic hydrocarbon which comprises passing to an alkylation zone containing boron trifluoride modified substantially anhydrous gamma-alumina, alkylatable aromatic hydrocarbon, olefin, and from about 0.001 gram to about 0.8 gram of boron trifluoride per gram mol of olefin, reacting therein said alkylatable aromatic hydrocarbon with said olefin at alkylation conditions in the presence of an alkylation catalyst comprising said boron trifluoride and boron trifluoride modified gamma-alumina, and recovering therefrom alkylated aromatic hydrocarbon.

7. A process for the production of an alkyl-aromatic hydrocarbon which comprises passing to an alkylation zone containing boron trifluoride modified substantially anhydrous theta-alumina, alkylatable aromatic hydrocarbon, olefin, and from about 0.001 gram to about 0.8 gram of boron trifluoride per gram mol of olefin, reacting therein said alkylatable aromatic hydrocarbon with said olefin at alkylation conditions in the presence of an alkylation catalyst comprising said boron trifluoride and boron trifluoride modified theta-alumina, and recovering therefrom alkylated aromatic hydrocarbon.

8. A process for the production of an alkyl-benzene hydrocarbon which comprises passing to an alkylation zone containing boron trifluoride modified substantially anhydrous gamma-alumina, alkylatable benzene hydrocarbon, olefin, and from about 0.001 gram to about 0.8 gram of boron trifluoride per gram mol of olefin, reacting therein said alkylatable benzene hydrocarbon with said olefin at alkylation conditions in the presence of an alkylation catalyst comprising said boron trifluoride and boron trifluoride modified gamma-alumina, and recovering therefrom alkylated benzene hydrocarbon.

9. A process for the production of an alkyl-benzene hydrocarbon which comprises passing to an alkylation zone containing boron trifluoride modified substantially anhydrous theta-alumina, alkylatable benzene hydrocarbon, olefin, and from about 0.001 gram to about 0.8 gram of boron trifluoride per gram mol of olefin, reacting therein said alkylatable benzene hydrocarbon with said olefin at alkylation conditions in the presence of an alkylation catalyst comprising said boron trifluoride and boron trifluoride modified theta-alumina, and recovering therefrom alkylated benzene hydrocarbon.

10. A process for the production of ethylbenzene which comprises passing to an alkylation zone containing boron trifluoride modified substantially anhydrous gamma-alumina, benzene, ethylene, and from about 0.001 gram to about 0.8 gram of boron trifluoride per gram mol of ethylene, reacting therein said benzene with said ethylene at alkylation conditions in the presence of an alkylation catalyst comprising said boron trifluoride and boron trifluoride modified gamma-alumina, and recovering therefrom ethyl-benzene.

11. A process for the production of cumene which comprises passing to an alkylation zone containing boron trifluoride modified substantially anhydrous gamma-alumina, benzene, propylene, and from about 0.001 gram to about 0.8 gram of boron trifluoride per gram mol of propylene, reacting therein said benzene with said propylene at alkylation conditions in the presence of an alkylation catalyst comprising said boron trifluoride and boron trifluoride modified gamma-alumina, and recovering therefrom cumene.

12. A process for the production of butylbenzene which comprises passing to an alkylation zone containing boron trifluoride modified substantially anhydrous gamma-alumina, benzene, a butene, and from about 0.001 gram to about 0.8 gram of boron trifluoride per gram mol of butene, reacting therein said benzene with said butene at alkylation conditions in the presence of an alkylation catalyst comprising said boron trifluoride and boron trifluoride modified gamma-alumina, and recovering therefrom butylbenzene.

13. A process for the production of ethylbenzene which comprises passing to an alkylation zone containing boron trifluoride modified substantially anhydrous theta-alumina, benzene, ethylene, and from about 0.001 gram to about 0.8 gram of boron trifluoride per gram mol of ethylene, reacting therein said benzene with said ethylene at alkylation conditions in the presence of an alkylation catalyst comprising said boron trifluoride and boron trifluoride modified theta-alumina, and recovering therefrom ethylbenzene.

14. A process for the production of cumene which comprises passing to an alkylation zone containing boron trifluoride modified substantially anhydrous theta-alumina, benzene, propylene, and from about 0.001 gram to about 0.8 gram of boron trifluoride per gram mol of propylene, reacting therein said benzene with said propylene at alkylation conditions in the presence of an alkylation catalyst comprising said boron trifluoride and boron trifluoride modified theta-alumina, and recovering therefrom cumene.

15. A process for the production of ethylbenzene which comprises passing to an alkylation zone containing boron trifluoride modified substantially anhydrous gamma-alumina, benzene, ethylene, and from about 0.001 gram to about 0.8 gram of boron trifluoride per gram mol of ethylene, reacting therein said benzene with said ethylene at alkylation conditions including a temperature of from about 0° to about 300° C. and a pressure of from about atmospheric to about 200 atmospheres in the presence of an alkylation catalyst comprising said boron trifluoride and boron trifluoride modified gamma-alumina, and recovering therefrom ethylbenzene.

16. A process for the production of cumene which comprises passing to an alkylation zone containing boron trifluoride modified substantially anhydrous gamma-alumina, benzene, propylene, and from about 0.001 gram to about 0.8 gram of boron trifluoride per gram mol of propylene, reacting therein said benzene with said propylene at alkylation conditions including a temperature of from about 0° to about 300° C. and a pressure of from about atmospheric to about 200 atmospheres in the presence of an alkylation catalyst comprising said boron trifluoride and boron trifluoride modified gamma-alumina, and recovering therefrom cumene.

17. A process for the production of butylbenzene which comprises passing to an alkylation zone containing boron trifluoride modified substantially anhydrous gamma-alumina, benzene, a butene, and from about 0.001 gram to about 0.8 gram of boron trifluoride per gram mol of butene, reacting therein said benzene with said butene at alkylation conditions including a temperature of from about 0° to about 300° C. and a pressure of from about atmospheric to about 200 atmospheres in the presence of an alkylation catalyst comprising said boron trifluoride and boron trifluoride modified gamma-alumina, and recovering therefrom butylbenzene.

18. A process for the production of ethylbenzene which comprises passing to an alkylation zone containing boron trifluoride modified substantially anhydrous theta-alumina, benzene, ethylene, and from about 0.001 gram to about 0.8 gram of boron trifluoride per gram mol of ethylene, reacting therein said benzene with said ethylene at alkylation conditions including a temperature of from about 0° to about 300° C. and a pressure of from about atmospheric to about 200 atmospheres in the presence of an alkylation catalyst comprising said boron trifluoride and boron trifluoride modified theta-alumina, and recovering therefrom ethylbenzene.

19. A process for the production of cumene which comprises passing to an alkylation zone containing boron trifluoride modified substantially anhydrous theta-alumina, benzene, propylene, and from about 0.001 gram to about 0.8 gram of boron trifluoride per gram mol of propylene, reacting therein said benzene with said propylene at alkylation conditions including a temperature of from about 0° to about 300° C. and a pressure of from about atmospheric to about 200 atmospheres in the presence of an alkylation catalyst comprising said boron trifluoride and boron trifluoride modified theta-alumina, and recovering therefrom cumene.

References Cited in the file of this patent

UNITED STATES PATENTS

| 2,584,103 | Pines et al. | Feb. 5, 1952 |
| 2,804,491 | May et al. | Aug. 27, 1957 |

FOREIGN PATENTS

| 1,028,700 | France | May 27, 1953 |